(12) United States Patent
Ham

(10) Patent No.: US 8,983,751 B2
(45) Date of Patent: Mar. 17, 2015

(54) CONTROL SYSTEM AND METHOD FOR STOPPING VEHICLE

(71) Applicant: Hyundai Mobis Co., Ltd., Seoul (KR)

(72) Inventor: Jun Ho Ham, Incheon (KR)

(73) Assignee: Hyundai Mobis Co., Ltd., Seoul (KR)

( * ) Notice: Subject to any disclaimer, the term of this patent is extended or adjusted under 35 U.S.C. 154(b) by 34 days.

(21) Appl. No.: 13/756,876

(22) Filed: Feb. 1, 2013

(65) Prior Publication Data

US 2013/0317719 A1    Nov. 28, 2013

(30) Foreign Application Priority Data

May 23, 2012 (KR) .................. 10-2012-0054629

(51) Int. Cl.
*B60K 31/00* (2006.01)
*B60W 30/17* (2012.01)
*B60W 10/04* (2006.01)
*B60W 10/18* (2012.01)

(52) U.S. Cl.
CPC ............. *B60K 31/00* (2013.01); *B60W 30/17* (2013.01); *B60W 10/04* (2013.01); *B60W 10/18* (2013.01); *B60W 2550/302* (2013.01); *B60W 2550/308* (2013.01); *B60W 2720/106* (2013.01)
USPC .................... 701/96; 701/93; 701/70

(58) Field of Classification Search
CPC ....... B60K 31/00; B60W 10/04; B60W 10/18; B60W 2720/106; B60W 2550/302; B60W 2550/308; B60W 30/17
USPC ................................ 701/96, 93, 70
See application file for complete search history.

(56) References Cited

U.S. PATENT DOCUMENTS

| 7,354,379 B2 * | 4/2008 | Moriya ................. 477/199 |
| 2004/0040765 A1 * | 3/2004 | Satou et al. ............ 180/170 |
| 2009/0043474 A1 * | 2/2009 | Nakai et al. ............ 701/70 |

FOREIGN PATENT DOCUMENTS

| EP | 1 609 656 | 4/2007 | | |
| JP | 2006-188155 | 7/2006 | | |
| JP | 2006-264571 | 10/2006 | | |
| JP | 2006264571 | * 10/2006 | ............ | B60K 31/00 |
| JP | 2006-327531 | 12/2006 | | |
| JP | 2007-314179 | 12/2007 | | |
| JP | 2007314179 | * 12/2007 | ............ | B60K 31/00 |
| KR | 10-2009-0062120 | 6/2009 | | |

* cited by examiner

*Primary Examiner* — Mary Cheung
*Assistant Examiner* — Brian P Sweeney
(74) *Attorney, Agent, or Firm* — NSIP Law

(57) ABSTRACT

Provided are a control system and method for stopping a vehicle, which reduce jerk when a vehicle controlled by an SCC system is stopped by the SCC system without a driver's manipulation. A desired target stop distance between a controlled vehicle and a front vehicle is set. Proposed is a formula for calculating a target acceleration in which a jerk is not caused when the target stop distance is maintained and then the controlled vehicle stops. By controlling the stop of the controlled vehicle according to the acceleration that has been calculated with the formula, the controlled vehicle is stopped without the occurrence of a jerk.

14 Claims, 4 Drawing Sheets

CONTROL SYSTEM AND METHOD FOR STOPPING VEHICLE

CROSS-REFERENCE TO RELATED APPLICATIONS

This application claims priority under 35 U.S.C. §119 to Korean Patent Application No. 10-2012-0054629, filed on May 23, 2012, the disclosure of which is incorporated herein by reference in its entirety.

TECHNICAL FIELD

The present disclosure relates to a smart cruise control (SCC) system that automatically adjusts the speed of a controlled vehicle on the basis of information, such as the relative distance and relative speed of an ambient vehicle which are sensed by a sensor of the controlled vehicle, and thus prevents a traffic accident, and in particular, to a control system and method for stopping a vehicle, which decrease or prevent jerks that are caused when a vehicle is stopped by SSC, and thus enable the vehicle to reduce a speed or stop smoothly.

BACKGROUND

An SCC system denotes a system that determines the forward conditions of a controlled vehicle by using a radar, and manipulates the engine or brake of the controlled vehicle depending on the conditions, thereby maintaining a vehicle speed without the manipulation of a driver and adjusting a distance between vehicles.

The SCC system operates in an area of 30 km/h or more, but, as the SCC system has a stop-and-go function, the SSC system needs to provide a stop control function. However, when a vehicle is stopped by the SCC system, large jerks, such as a pitch motion and noise dive, are caused due to discontinuity in which there is no backing. Furthermore, even though a related art controller having no over-shoot function is used, due to practical limitations such as the delay and inaccuracy of a brake apparatus and the delay and error of a radar, it is difficult to prevent the above-described drawbacks.

Due to practical uncertainty, a related art stop-and-go controller cannot prevent a jerk which is caused when a vehicle stops in driving. In methods of reducing the occurrence of jerks, there is a method that realizes a soft-stop function by decreasing a brake pressure in a slight deceleration. The method cannot decrease or prevent the occurrence of jerks, and cannot be applied to a case in which a deceleration is high or middle. Therefore, the method cannot respond to all driving conditions. Also, there is a method that selects an appropriate parameter and performs variable control depending on driving conditions, but the method cannot propose a detailed scheme and result.

At present, there is an experimental method that decreases jerks which are caused when a vehicle is stopped by the SCC system, only in a limited condition, but there is no deductive method that removes the cause of a jerk and thus prevents the jerk from occurring when a vehicle stops. Therefore, due to a jerk that is caused when a vehicle stops, many vehicles using the SCC system cause fatigued and unpleasant feelings to a driver, and thus, the salability of SCC vehicles decreases.

SUMMARY

Accordingly, the present disclosure provides a method that sets a target stop distance and calculates a target acceleration (which enables soft-stop over the target stop distance) with a logical formula when a controlled vehicle is stopped by an SCC system depending on the driving or stop of a front vehicle.

The present disclosure also provides a control system and method for stopping a vehicle, which control the stop of a vehicle with a calculated target acceleration, and thus prevent a jerk from occurring when the vehicle is stopped by the SCC system depending on various conditions.

In one general aspect, a SCC system includes: a receiver receiving relative distance information and relative speed information of an ambient vehicle and speed information and acceleration information of a controlled vehicle which are sensed by a sensor of the controlled vehicle; a stop control activator generating a stop control activation signal when a front vehicle is determined to be in a stop state while the controlled vehicle is driving, on the basis of at least one of a plurality of the received information; and a controller setting one of a plurality of predetermined stop distance candidates as a target stop distance when the stop control activation signal is received, checking whether there is a design variable range that enables soft-stop over the set target stop distance on the basis of the information received by the receiver, and calculating a target acceleration by using the target stop distance and a design variable determined according to the checked result.

The controller may check whether the controlled vehicle is capable of stopping before reaching the target stop distance, whether an absolute value of the target acceleration to be calculated with the design variable and a practical acceleration in stop control exceed an allowable acceleration of the controlled vehicle, and whether the target acceleration is capable of being estimated with a reaction speed of a brake apparatus, and determine the design variable. Furthermore, when there is a design variable range, the design variable may be determined as an intermediate value within the design variable range, and when there is no design variable that satisfies the range, the design variable may be determined as a maximum value of a plurality of boundary values with the design variable range.

The controller may calculate a speed gain and a distance gain with the determined design variable, and more specifically, the controller may calculate the speed gain and the distance gain by using at least one of the determined design variable and a time for which the controlled vehicle reaches a location of the front vehicle at a current speed. Furthermore, the controller may calculate the target acceleration with the calculated speed gain and distance gain and the target stop distance, thereby controlling the stop of the controlled vehicle.

In another general aspect, a SCC method includes: generating a stop control activation signal when it is checked that an ambient vehicle is a stop state and a controlled vehicle is in a driving state, on the basis of relative speed information of the ambient vehicle and speed information of the controlled vehicle which are sensed by a sensor of the controlled vehicle; setting one of a plurality of predetermined stop distance candidates as a target stop distance when the stop control activation signal is received; checking whether there is a design variable range that enables soft-stop of the controlled vehicle over the set target stop distance; calculating a speed gain and a distance gain with an intermediate value within the design variable range when it is checked that there is the design variable range; calculating a target acceleration with the calculated speed gain and distance gain and the target stop distance; and transferring the target acceleration to a driving apparatus to control stop of the controlled vehicle.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
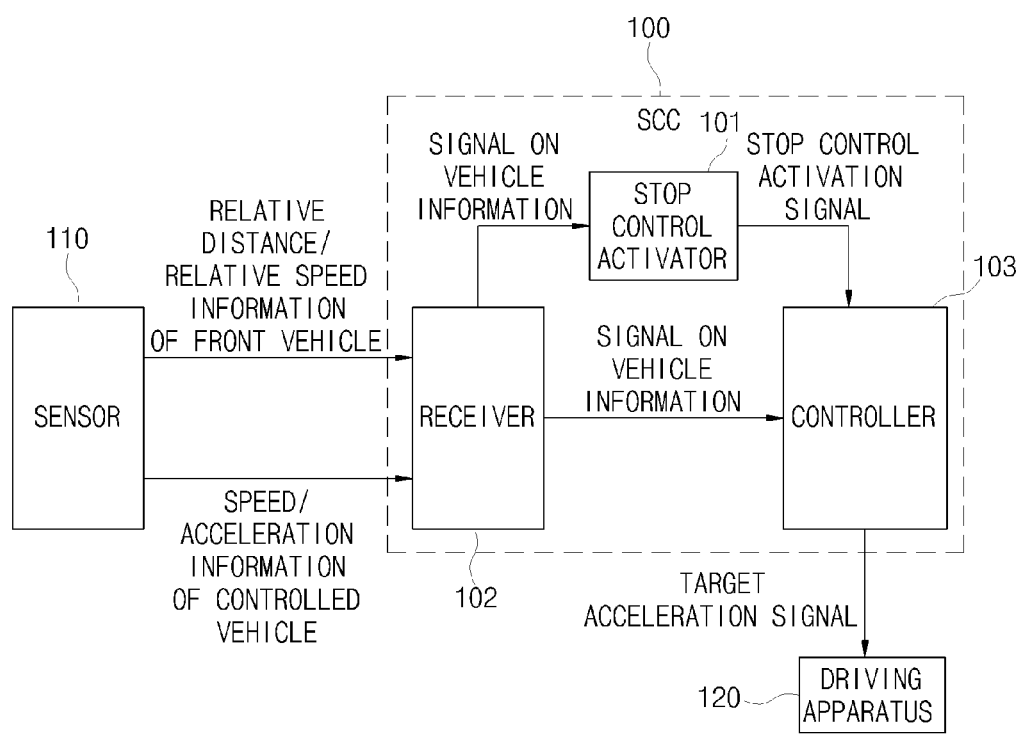
FIG. 1 is a block diagram illustrating a control system for stopping a vehicle according to an embodiment of the present invention.

FIG. 1 is a block diagram illustrating a structure of a control system for stopping a vehicle according to an embodiment of the present invention.

A sensor 110 or radar mounted on a controlled vehicle senses the relative distance and relative speed of an ambient vehicle (for example, a front vehicle) near the controlled vehicle, and transmits sensing information, including the sensed distance and speed signals, to a vehicle stop control system 100. The sensing information may be transmitted through wired or wireless communication. The vehicle stop control system 100 receives the sensing information and information on the speed and acceleration of the controlled vehicle.

The vehicle stop control system 100 includes a stop control activator 101, a receiver 102, and a controller 103. The receiver 102 receives information on an ambient vehicle and information on the speed and acceleration of the controlled vehicle from the sensor 110 or radar of the controlled vehicle. The receiver 102 transfers the received information to the stop control activator 101 and the controller 103.

The stop control activator 101 determines whether the ambient vehicle is in a stop state on the basis of the relative speed information of the ambient vehicle and the speed information of the controlled vehicle that are inputted from the receiver 102. Furthermore, the stop control activator 101 determines whether the controlled vehicle is in a stop state or a driving state, on the basis of the speed information and acceleration information of the controlled vehicle. In this case, when the speed of the controlled vehicle is higher than or equal to a certain speed or the absolute acceleration is higher than or equal to a certain level, the stop control activator 101 determines there to be in the driving state. When the front vehicle is in the stop state and the controlled vehicle is driving, the stop control activator 101 generates a stop control activation signal and transfers the stop control activation signal to the controller 103.

The controller 103 starts to control the stop of the controlled vehicle according to the stop control activation signal inputted from the stop control activator 101. In an operation of calculating a target acceleration, the controller 103 uses vehicle information inputted from the receiver 102.

The controller 103 sets a target stop distance "$c_i$" (where i is an integer from zero to N, which is a natural number more than or equal to one) that is a desired interval between the front vehicle and the controlled vehicle which is stopped, for performing stop control. The controller 103 selects one distance from among a plurality of predetermined stop distance candidates (for example, N+1 number of distance values in which a current distance between vehicles is the maximum distance, and the N+1 distance values are set by sequentially decreasing the maximum distance in units of a distance of 0.5 m), and sets the selected distance as the target stop distance. The controller 103 determines whether there is the range of a design variable "$w_n$" that enables the soft-stop of the controlled vehicle, over the set target stop distance. When the first-set target stop distance is assumed as $c_o$, the controller 103 determines whether there is a design variable that meets the following conditions.

$$w_n \geq \frac{-\dot{e}(O)}{e(O) - c_o} \quad (1)$$

$$w_n \geq \frac{-\dot{e}(O) + \sqrt{\dot{e}(O)^2 + a_{max}(e(O) - c_o)}}{e(O) - c_o} \quad (2)$$

$$w_n \leq \sqrt{\frac{|a_{max}| \cdot \exp^2}{e(O) - c_o}} \quad (3)$$

$$w_n << \frac{1}{\tau} \quad (4)$$

where $\dot{e}(O)$ denotes a speed difference between the front vehicle and the controlled vehicle, $e(O)$ denotes a distance between the front vehicle and the controlled vehicle, $a_{max}$ denotes the maximum allowable negative acceleration of the SCC system, exp denotes a natural constant, and $\tau$ denotes the reaction speed of a vehicle actuator.

To describe in more detail conditions for checking an area in which there is the design variable, the minimum design variable range that does not exceed a predetermined candidate target stop distance in performing stop control is considered. This is specifically expressed as Equation (1). When the minimum design variable range is greater than zero, the following condition is considered.

A design variable range in which the currently calculated absolute value of a target acceleration is within an allowable acceleration. This may be specifically expressed as Equation (2). A design variable range, which does not exceed an allowable acceleration when stop control is being performed after the present, is considered. This may be specifically expressed as Equation (3). A design variable range, which has a stop control speed sufficiently slower than the reaction speed of a brake apparatus, is considered. This may be specifically expressed as Equation (1).

The above-described conditions have been considered for a case in which the front vehicle stops, the controlled vehicle is driving, and a distance to the front vehicle is greater than a candidate target stop distance. When there is the design variable "$w_n$" that meets the above-described condition, the controller 103 calculates a target acceleration "$a_i$" by using a currently set target stop distance and an intermediate value of values that meet the design variable range.

However, when there is no design variable range, the controller 103 selects another stop distance candidate from among the predetermined stop distance candidates to set a target stop distance as a new value, and determines whether there is no design variable range. When there is no design variable range for all of the stop distance candidates, the controller 103 calculates the target acceleration by using the shortest target stop distance of the stop distance candidates and the maximum value of boundary values of a design variable for the shortest target stop distance.

A method, in which the controller 103 calculates the target acceleration, uses the design variable (which has been obtained through the above-described operation) and the target stop distance that has been set in determining the design variable value, in which case the controller 103 first calculates an SCC speed gain "$k_v$" and an SCC distance gain "$k_c$" by using the design variable. The SCC speed gain and the SCC distance gain may be calculated with one of the following Equations (5) and (6).

$$k_v + T_g k_c = 2w_n, k_c = w_n^2 \quad (5)$$

$$k_v = 2w_n, k_c = w_n^2 \quad (6)$$

where $T_g$ indicates a time interval (sec) of the SCC system, and denotes a time for which the controlled vehicle reaches the stopped front vehicle when the controlled vehicle is continuously driving at a current speed.

The controller 103 calculates the SCC speed gain and the SCC distance gain with Equations (5) and (6), and then calculates a target acceleration "$a_i$" in which the controlled vehicle is capable of maintaining a constant distance to the front vehicle and stopping.

$$a_i = k_v \dot{e} + k_c(e - c_i) \quad (7)$$

where $\dot{e}$ denotes the relative speed of an ambient vehicle, e denotes the relative distance of the ambient vehicle, and $c_i$ denotes the target stop distance that has been set in determining the design variable.

The controller 103 may calculate the target acceleration "$a_i$" in which the target stop distance "$c_i$" between the front vehicle and the controlled vehicle is maintained and soft-stop in which a jerk does not occur is performed, through the above-described operation. The controller 103 transmits the calculated target acceleration "$a_i$" to a driving apparatus 120, thereby allowing the controlled vehicle to be stopped.

Figure 2:
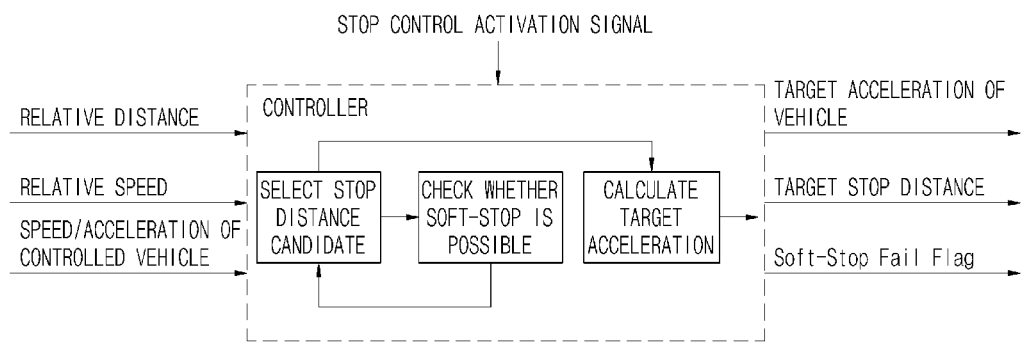
FIG. 2 is a diagram illustrating in detail a process in a controller of the control system for stopping a vehicle according to an embodiment of the present invention.

FIG. 2 is a diagram illustrating in detail a process in a controller of the control system for stopping a vehicle according to an embodiment of the present invention.

The controller 130 receives information on the relative distance and relative speed of the front vehicle and information on the speed and acceleration of the controlled vehicle, through the receiver 102. When the controller 103 receives the stop control activation signal, the controller 103 selects the target stop distance from among the predetermined stop distance candidates, and checks whether soft-stop is possible over the target stop distance. When soft-stop is impossible, the controller 103 selects a new target stop distance from among the predetermined stop distance candidates, and checks whether soft-stop is possible over the new target stop distance.

When the target stop distance has been checked, the controller 103 calculates a target acceleration that enables soft-stop, by using the information on the relative distance and relative speed of the front vehicle and the target stop distance, and thus controls the controlled vehicle according to the target acceleration.

Figure 3:
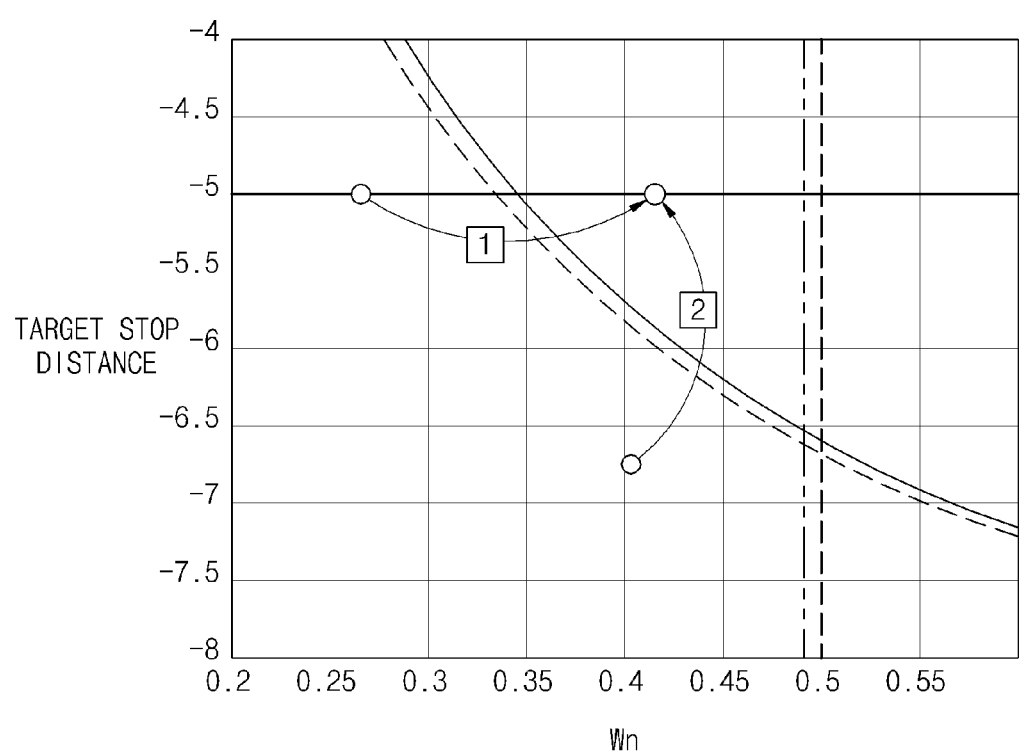
FIG. 3 is a diagram showing an application example of the control system for stopping a vehicle according to an embodiment of the present invention.

FIG. 3 shows a case in which a target stop distance is changed or the design variable "$w_n$" increases due to an external factor such as that a brake force becomes lower in practical driving. In [1] of FIG. 3, since there is a design variable "$w_n$" that enables soft-stop over a corresponding target stop distance of 5 m, the controller 103 selects the design variable "$w_n$" as an intermediate value of a boundary to calculate the control gains "$k_v$" and "$k_c$" and the target acceleration "$a_i$", and transfers the calculated gains and target acceleration to the driving apparatus 120. In [2] of FIG. 3, since there is no design variable "$w_n$" that enables soft-stop over a corresponding target stop distance of 6.8 m, the controller 103 selects another candidate stop distance and checks whether there is a design variable "$w_n$" that enables soft-stop.

Figure 4:
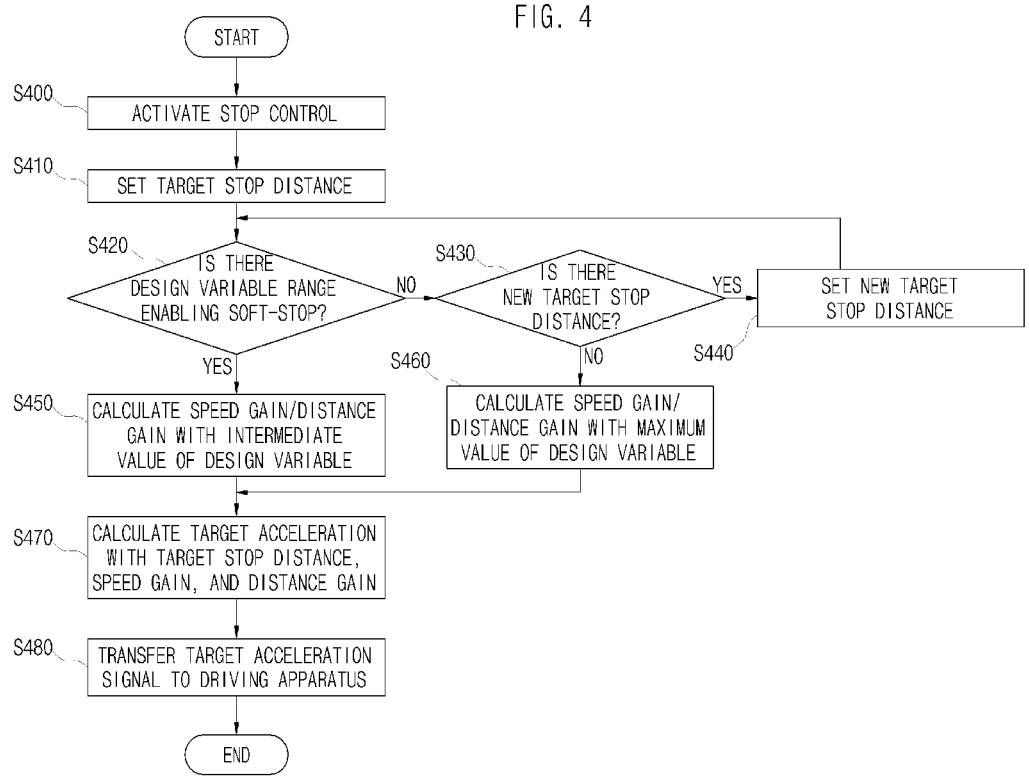
FIG. 4 is a block diagram illustrating a control method for stopping a vehicle according to an embodiment of the present invention.

FIG. 4 is a block diagram illustrating a control method for stopping a vehicle in which a jerk is not caused by the control system for stopping a vehicle according to an embodiment of the present invention.

When the stop state of a front vehicle and the driving state of a controlled vehicle are checked on the basis of information on the relative speed of the front vehicle and the speed/acceleration information of the controlled vehicle and stop control is activated by the control system for stopping a vehicle in operation S400, the control system selects and sets a target stop distance from among a plurality of predetermined stop distances in operation S410, and determines whether there is a design variable range in which the target stop distance is maintained between the front vehicle and the controlled vehicle and soft-stop is capable of being performed in operation S420.

When there is no design variable range that satisfies a necessary condition over the set target stop distance, the control system checks whether there is a new stop distance candidate in operation S430. When there is the new stop distance candidate, the control system newly sets a target stop distance in operation S440, and then again determines whether there is a design variable range in operation S420.

On the other hand, when there is the design variable range that satisfies the necessary condition over the set target stop distance, the control system calculates a speed gain and a distance gain with an intermediate value within the design variable range in operation S450. When there is no design variable range over all target stop distances, the control system calculates the speed gain and the distance gain with the maximum value of boundary values that satisfy Equations (1) to (4) in operation S460.

The control system calculates a target acceleration in which the controlled vehicle is capable of stopping without the occurrence of a jerk, by using the calculated speed gain, distance gain, and target stop distance in operation S470. The control system transmits the target acceleration to a driving apparatus in operation S480, and thus controls the stop of the controlled vehicle without the occurrence of a jerk.

As described above, the present invention provides the method that sets a target stop distance and calculates a target acceleration (which enables soft-stop over the target stop distance) with a logical formula when a controlled vehicle is stopped by an SCC system depending on the driving or stop of a front vehicle. Also, the present invention provides the control system and method for stopping a vehicle, which control the stop of a vehicle with a calculated target acceleration, and thus prevent a jerk from occurring when the vehicle is stopped by the SCC system depending on various conditions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A smart cruise control (SCC) system, comprising:
a receiver configured to receive distance information and speed information of an ambient vehicle and speed information and acceleration information of a control vehicle that are sensed by a sensor of the control vehicle;
a stop control activator configured to generate a stop control activation signal when a front vehicle is determined to be in a stop state while the control vehicle is driving, on the basis of at least one of a plurality of the received information; and
a controller configured to set one of a plurality of predetermined stop distance candidates as a target stop distance when the stop control activation signal is received, to check whether there is a design variable range that enables soft-stop over the set target stop distance on the basis of the information received by the receiver, and to calculate a target acceleration by using the target stop distance and a design variable determined according to the checked result.

2. The SCC system of claim 1, wherein the controller is further configured to checks whether the control vehicle is capable of stopping before reaching the target stop distance, whether an absolute value of the target acceleration to be calculated with the design variable and a practical acceleration in stop control exceed an allowable acceleration of the control vehicle, and whether the target acceleration is capable of being estimated with a reaction speed of a brake apparatus, and determines the design variable.

3. The SCC system of claim 2, wherein the controller is further configured to determine the design variable from among a plurality of values within a range that meets the following Equations, $$w_n \geq \frac{-\dot{e}(O)}{e(O) - c_o}$$

$$w_n \geq \frac{-\dot{e}(O) + \sqrt{\dot{e}(O)^2 + a_{max}(e(O) - c_o)}}{e(O) - c_o}$$

$$w_n \leq \sqrt{\frac{|a_{max}| \cdot \exp^2}{e(O) - c_o}}$$

$$w_n << \frac{1}{\tau}$$

where $\dot{e}(O)$ denotes a speed difference between the front vehicle and the control vehicle, $e(O)$ denotes a distance between the front vehicle and the control vehicle, $a_{max}$ denotes the maximum allowable negative acceleration of the SCC system, exp denotes a natural constant, and $\tau$ denotes the reaction speed of a vehicle actuator.

4. The SCC system of claim 1, wherein the controller is further configured to calculate a speed gain and a distance gain with the determined design variable, and to calculate the target acceleration with the calculated speed gain and distance gain and the target stop distance.

5. The SCC system of claim 4, wherein the controller is further configured to calculate the speed gain and the distance gain using at least one of the determined design variable and a time for which the control vehicle reaches a location of the front vehicle at a current speed.

6. The SCC system of claim 5, wherein the controller is further configured to calculate the speed gain and the distance gain with the following Equation, $$k_v + T_g k_c = 2w_n, k_c = w_n^2$$

where $k_v$ denotes a speed gain, $T_g$ denotes a time interval, $k_c$ denotes a distance gain, and $w_n$ denotes a design variable.

7. The SCC system of claim 6, wherein the controller is further configured to calculate the target acceleration with the following Equation, $$a_i = k_v \dot{e} + k_c(e - c_i)$$

where $a_i$ denotes a target acceleration, $k_v$ denotes a speed gain, $\dot{e}$ denotes a speed of an ambient vehicle, $k_c$ denotes a distance gain, $e$ denotes a distance of the ambient vehicle, and $c_i$ denotes a target stop distance.

8. The SCC system of claim 5, wherein the controller is further configured to calculate the speed gain and the distance gain with the following Equation, $$k_v = 2w_n, k_c = w_n^2$$

where $k_v$ denotes a speed gain, $k_c$ denotes a distance gain, and $w_n$ denotes a design variable.

9. The SCC system of claim 8, wherein the controller is further configured to calculate the target acceleration with the following Equation, $$a_i = k_v \dot{e} + k_c(e - c_i)$$

where $a_i$ denotes a target acceleration, $k_v$ denotes a speed gain, $\dot{e}$ denotes a speed of an ambient vehicle, $k_c$ denotes a distance gain, $e$ denotes a distance of the ambient vehicle, and $C_i$ denotes a target stop distance.

10. The SCC system of claim 1, wherein when it is checked that there is a design variable range which enables soft-stop over the target stop distance, the controller is further configured to determine an intermediate value within the design variable range as a design variable, and to calculate the target acceleration with the determined design variable and the target stop distance.

11. The SCC system of claim 1, wherein,
when it is checked that there is no design variable range which enables soft-stop over the target stop distance, the controller is further configured to set one of the other predetermined stop distance candidates as a new target stop distance to check whether there is a design variable range, and
when there is no longer predetermined stop distance candidate, the controller is further configured to calculate the target acceleration with a shortest target stop distance of the candidates and a maximum value of a plurality of boundary values of a design variable for the shortest target stop distance.

12. The SCC system of claim 1, wherein the controller is further configured to transfer the calculated target acceleration to a driving apparatus to control stop of the control vehicle.

13. A smart cruise control (SCC) method, comprising:
generating a stop control activation signal when it is checked that an ambient vehicle is in a stop state and a control vehicle is in a driving state, on the basis of speed information of the ambient vehicle and speed information of the control vehicle which are sensed by a sensor of the control vehicle;
setting one of a plurality of predetermined stop distance candidates as a target stop distance when the stop control activation signal is received;
checking whether there is a design variable range that enables soft-stop of the control vehicle over the set target stop distance;
calculating a speed gain and a distance gain with an intermediate value within the design variable range when it is checked that there is the design variable range;
calculating a target acceleration with the calculated speed gain and distance gain and the target stop distance; and
transferring the target acceleration to a driving apparatus to control stop of the control vehicle.

14. The SCC method of claim 13, further comprising:
setting one of the other predetermined stop distance candidates as a new target stop distance, in response to there being no design variable range; and
calculating the target acceleration with a shortest target stop distance and a maximum value of a plurality of boundary values within a design variable range for the shortest target stop distance, in response to there being no longer predetermined stop distance candidate.

\* \* \* \* \*